United States Patent [19]

Hulbert et al.

[11] Patent Number: 5,430,889
[45] Date of Patent: Jul. 4, 1995

[54] AUTOMATIC POWER CONTROL SYSTEM FOR A MOBILE RADIO SYSTEM

[75] Inventors: Anthony P. Hulbert, Southampton; David P. Chandler, Romsey, both of England

[73] Assignee: Roke Manor Research Limited, Hampshire, England

[21] Appl. No.: 112,224

[22] Filed: Aug. 27, 1993

[30] Foreign Application Priority Data

Sep. 30, 1992 [GB] United Kingdom ............... 9220579.8

[51] Int. Cl.$^6$ ............................................... H04B 7/26
[52] U.S. Cl. .................................. 455/33.1; 455/38.3; 455/56.1; 455/70
[58] Field of Search ..................... 455/33.1, 38.1, 38.3, 455/53.1, 54.1, 56.1, 63, 67.1, 67.3, 67.6, 68, 70

[56] References Cited

U.S. PATENT DOCUMENTS

| | | | |
|---|---|---|---|
| 4,670,906 | 6/1976 | Thro . | |
| 4,811,421 | 3/1989 | Havel et al. | 455/70 X |
| 5,241,690 | 8/1993 | Larsson et al. | 455/70 X |
| 5,265,119 | 11/1993 | Gilhousen et al. | 455/54.1 X |

*Primary Examiner*—Reinhard J. Eisenzopf
*Assistant Examiner*—Chi H. Pham
*Attorney, Agent, or Firm*—Hill, Steadman & Simpson

[57] ABSTRACT

An automatic power control system for a cellular mobile radio system, comprising: a control center via which a plurality of base stations, each serving a cell, are linked to facilitate mutual communication between mobile units which gain access to the cellular mobile radio system via the base stations; at least two mobile units distinguishable by identification codes, the mobile units being arranged to transmit, in addition to an identification code unique to each mobile unit, a data sequence common to each mobile unit, but transmitted by each mobile unit at a nominally different time within each burst; each of said the stations including correlator operative to discriminate between signals from mobile units within its own cell and interfering signals from mobile units in adjacent cells and a data logger; and a data processing unit located at the control center and arranged to merge data from the data loggers located at each of the base stations, which serves to store the results of correlation of the data sequence common to each mobile unit, so that details of relative power levels and times of reception are recorded as these details relate to signals received, the control center including a signal processor responsive to the data logger at each base station for identifying mobile units involved in potentially mutually interfering situations and feeding back instructions as appropriate to each of the base stations whereby power control signals are transmitted to these mobile units over the radio link from the base stations.

5 Claims, 2 Drawing Sheets

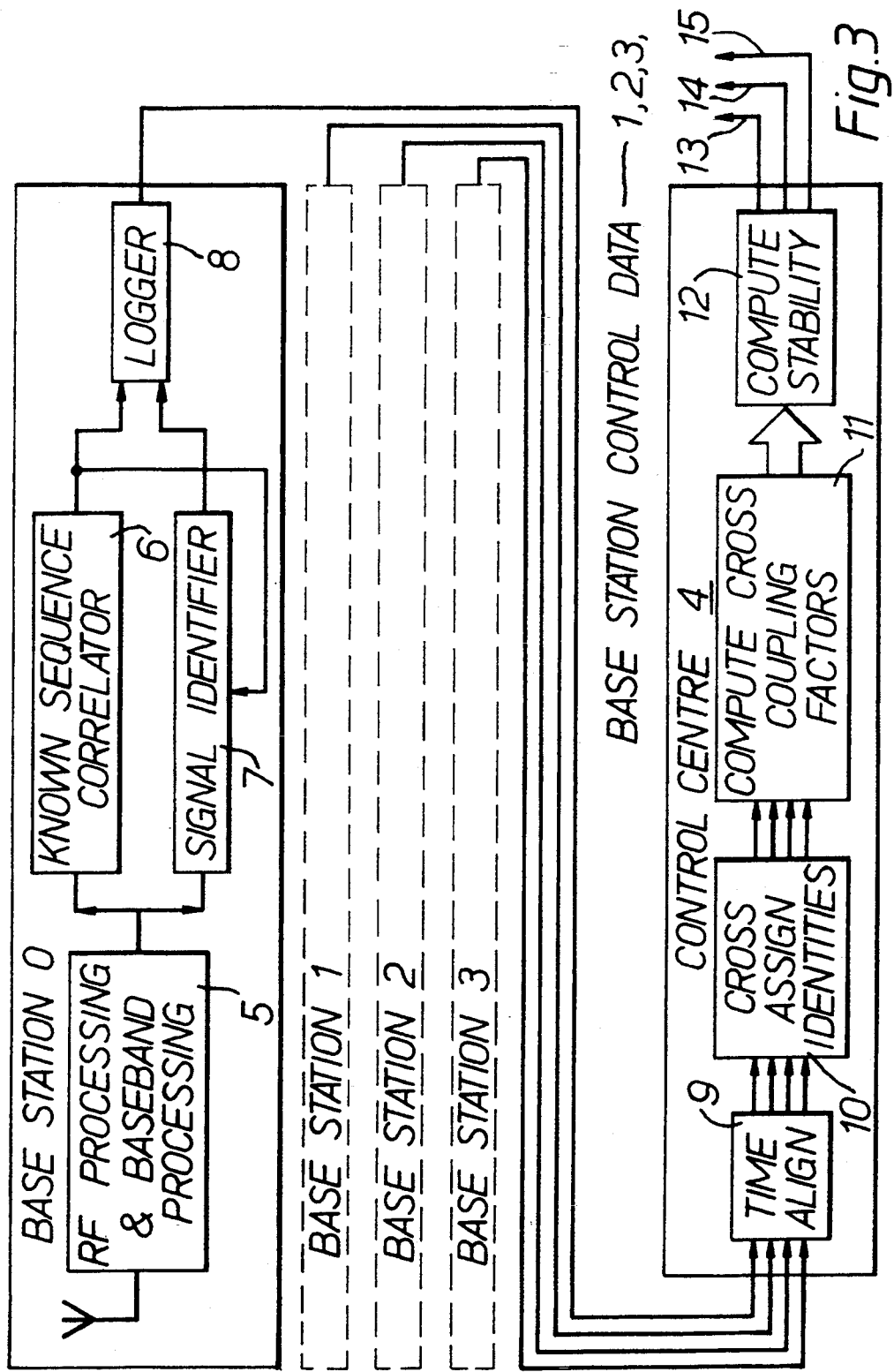

AUTOMATIC POWER CONTROL SYSTEM FOR A MOBILE RADIO SYSTEM

BACKGROUND OF THE INVENTION

This invention relates to mobile radio systems, and more especially it relates to automatic power control systems for use therein.

The term mobile radio system as used herein includes systems having a base station in mutual radio communication with a plurality of portable, transportable or mobile, e.g., vehicularly radio units.

In cellular mobile radio systems it has been shown that it is possible to obtain improved system capacity through the use of automatic control of the transmitted power (herein referred to simply as "power control") of the mobile radios. This reduces the transmitted power to the absolute minimum necessary to obtain acceptable communications. This minimum power for a given mobile radio is a function both of its radio path characteristics to, and the interference at the base station with which it is communicating.

Known power control systems make use of a feedback control link in which the required power is, in some suitable way, signalled back from the base station to the mobile unit to enable the mobile unit to set a correct power level. Such a system will work well provided the number of active users does not exceed the available system capacity at any given time. However, when this capacity is exceeded, there is a mechanism for instability in the overall power control system.

This mechanism arises, as will hereinafter be described, due to the formation of a positive feedback loop involving at least two base stations and at least two mobile radios, one operatively associated with each of the base stations and on the same or similar channel frequency, whereby each base station receives the signal from two or more mobile radios. Thus, in addition to a wanted signal from one mobile radio at least one other signal is received from another mobile radio which is regarded as noise. When this situation arises, two base stations may signal a requirement to their associated mobile radio for more power (to improve the signal to noise ratio), with the rather obvious result that the system will become unstable to the extent that maximum power will eventually be transmitted by both mobile radios which will in turn effectively prevent communication.

SUMMARY OF THE INVENTION

The present invention provides an automatic power control system, wherein the foregoing shortcoming is obviated or at least alleviated.

In an embodiment of the present invention, an automatic power control system for a mobile radio system comprises a control center via which a plurality of base stations are linked to facilitate mutual communication between mobile radio units which gain access to the system via the said base stations, the mobile radio units being arranged to transmit, in addition to an identification code unique to each mobile radio unit, a data sequence common to each mobile radio unit, but transmitted by each mobile radio unit at a nominally different time within each burst, each base station including correlator means operative to discriminate between signals from mobile radio units within its own cell, (which mobile radio units are distinguished by their identification code), and interfering signals from mobile radio units in adjacent cells, and a data logger which serves to store the results of correlation so that details of relative power levels and times of reception are recorded as they relate to signals received, the control center including a signal processor responsive to the data logger at each base station for identifying mobile radio units involved in potentially mutually interfering situations and feeding back appropriate instructions to the base stations concerned whereby suitable power control signals are transmitted to these mobile radio units.

Since the control center is placed in possession of data appertaining to signals received by base stations from mobile radios in adjacent cells, which may potentially mutually interfere as indicated by their relative power levels and timing, appropriate power control measures can be effected whereby mutual interference is obviated or at least minimized.

The said data sequence may be random in time and communicated to the base station by a mobile radio with which it is in communication.

The data sequence may be pseudo random in time and predetermined to the extent that it is known in advance by both the base station and a mobile radio with which it is in communication.

In an embodiment, the invention provides a system in which mobiles are arranged to transmit a common known sequence at different times and the base stations are arranged to correlate against this sequence throughout the data transmission burst period to measure the signal levels from all mobiles within range. Base stations log the levels and times of reception. The data is aggregated over the network interconnecting the base stations to a common point. At this common point the timings of the unknown mobile signal reception peaks are matched to those of the known in other base stations in order to identify the mobile associated with every correlation peak.

In one contemplated system of the invention, a collision avoidance scheme may be implemented wherein a base station instructs one or more mobile radios move if there is a potential mutual interference problem.

In a collision avoidance scheme, a data replacement system may be employed wherein data damaged by mutual interference is detected and replaced by valid data from previous bursts.

Some embodiments of the invention will now be described in the following detailed description of the presently preferred embodiments, solely by way of example, with reference to the accompanying drawings.

BRIEF DESCRIPTION OF THE DRAWINGS

FIG. 3 is a block schematic diagram of a system according to the present invention.

DETAILED DESCRIPTION OF THE PRESENTLY PREFERRED EMBODIMENTS

Figure 1:
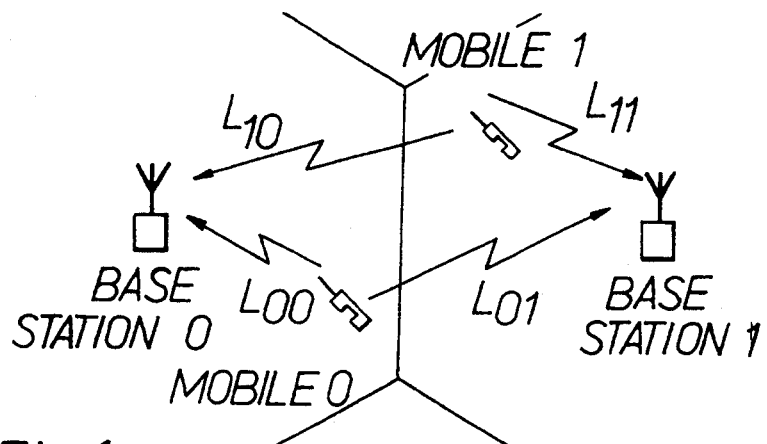
FIG. 1 is a substantially schematic diagram illustrating conditions for instability.

Referring now to the drawings, existing power control systems make use of a feedback control link in which the required power is set in some suitable way which involves, signalling back from a base station to an associated mobile radio to enable that mobile radio to set the correct power level. Such a system will work well provided the number of active users does not exceed the available system capacity at any given time. However, when this does happen, there is a tendency to instability in the overall power control system. This is best understood in terms of just two base stations and two mobile stations with one mobile radio affiliated to one base station and the other mobile radio affiliated to the other base station as shown in FIG. 1.

Hereinafter the above mobile radios are referred to simply as mobiles.

Mobile 0 is affiliated to base station 0 and mobile 1 to base station 1. $L_{ij}$ is the path gain (the reciprocal of path loss) from the mobile affiliated to a base station 1 to a base station j. It can easily be shown that if both base stations demand a signal to interference ratio equal to R, then the power will increase up to a maximum available if:

$$\frac{L_{10} \cdot L_{01}}{L_{11} \quad L_{00}} \cdot R^2 > 1 \ldots 1$$

Qualitatively, this condition arises when it is impossible to satisfy the signal to interference requirements of both mobiles simultaneously.

Consider a case when the mobile 0 has been activated and the mobile 1 is requesting access. The foregoing equation provides a means of testing whether or not it is safe to grant the request of mobile 1. If the left hand side is less than unity, then it is safe to do so. However, performance of this test requires knowledge of all values of $L_{ij}$.

In a more realistic scenario involving many mobiles and base stations a more complex equation, but nevertheless equivalent to the foregoing equation applies. This again depends on knowledge of all significant values of $L_{ij}$ for every mobile. Indeed a more general variable is required, referred to as $L_{lmj}$, which is the path gain from the mth mobile affiliated to base station 1 to base station j. For mobile m affiliated to base station 1, the ratio $L_{lmj}/L_{lml}$ is the cross coupling between base stations 1 and j attributable to that mobile.

The substance of this invention is to provide a practical means of performing these measurements and taking appropriate action in dependence on the results to avoid instability under mutual interference.

It is desirable to maintain the values of $L_{lmj}$ up to date for active mobiles at all times. The system could become unstable either if a new mobile is activated with too much cross coupling, or if one or more existing activated mobiles are moved to new locations so that the cross coupling increases unacceptably.

Thus, it is apparent that regular measurement of $L_{lmj}$ for active mobiles is required and measurement of a value for new mobiles is also required in order to test whether affiliation is possible.

Every active mobile is affiliated to a base station and is arranged to transmit data to that base station. For the purpose of this invention, it is assumed that the transmission of data is performed in discrete bursts and that these bursts contain a sequence of known bits for the purposes of synchronization, channel estimation, etc. The receiver in the base station corresponding to a particular mobile will perform a correlation against the known data sequence in order to perform the necessary timing and channel estimation functions. The magnitude of the correlation provides an estimate of the power received from that particular mobile. Thus, for a transmit power of $M_{lm}$ at the mobile we may readily obtain a reasonable measurement of $L_{lml}$ from mobile m at base station 1 (we shall see later that this is not necessary to obtain a value for $M_{lm}$). If the base stations surrounding base station 1 also provide correlation for the known data sequence transmitted by mobile m, they too could estimate the received signal strength from the magnitude of the measured correlation peak. Furthermore, knowledge of $M_{lm}$ would permit the determination of $L_{lmj}$ for the jth base station. However, since we only require a value for $L_{lmj}/L_{lml}$ it is not necessary to determine $M_{lm}$.

Whilst the above approach would, in principle, be possible, it would be very unattractive, requiring, in each base station, a separate correlator for every mobile which could conceivably interfere with that base station. Not only would this require a considerable amount of hardware, but it would also need significant traffic in the network connecting the base stations to inform them as to which correlators to assign.

An important feature of this invention is to arrange that all mobiles transmit the same known data sequence but at different times within a burst. Each base station will then need only one single fast correlator which will provide measurable correlation peaks for all mobiles with significant interference energy. The peak corresponding to any mobile(s) affiliated to a particular base station will be recognized by that base station as its own by means of some data signature, readily detectable once the peak had been found. At this point each base station is able to obtain measurements of received power for many mobiles but is only able to determine the identity of those mobiles which are communicating through it. This information, however, can be obtained from the relative times of the correlation peaks when the information is aggregated at a switching center as shown in FIG. 2.

Figure 2:
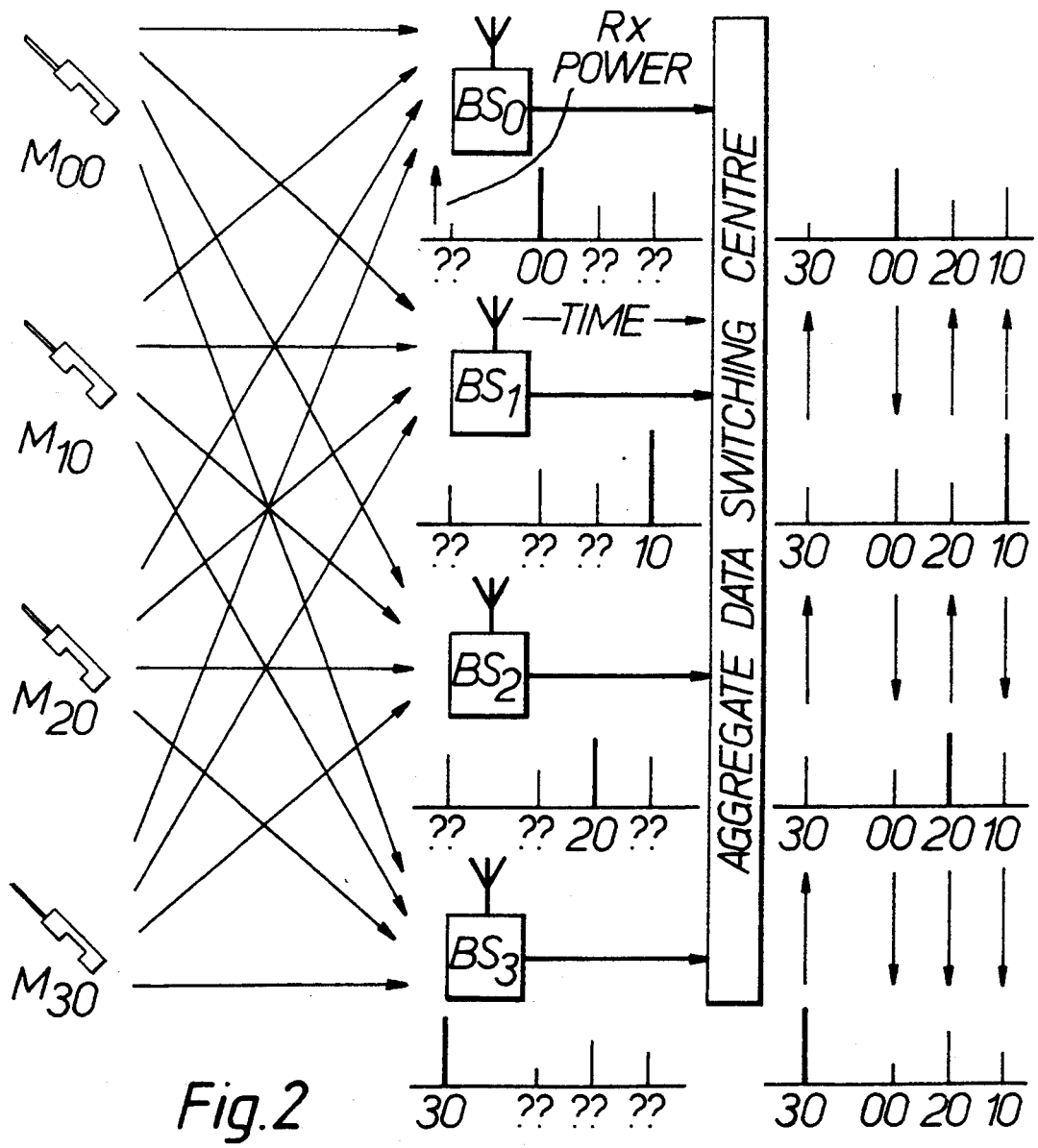
FIG. 2 is a diagram showing signal interference between mobile radios associated with different base stations.

Referring to FIG. 2, each base station (O to 3) has just one active mobile. The mobiles transmit their sequences of known data at various times and each of the base stations correlates against this known data. For each base station there is one mobile with a known identifier which enables the base station to identify its own mobile uniquely. For the mobiles affiliated to the other base stations all that is known is the signal level and the time of arrival. This is illustrated by the display underneath each base station. All of this information is sent over the network which interconnects the base stations to a switching control center. This switching control center may be in one of the base stations or it may be a dedicated switching center, etc. The information sent is the time of arrival of each of the signal peaks, the magnitude of the signal peaks and the identity of the known signal(s)—essentially everything illustrated in the display as shown beneath each base station.

At the control center or aggregation point, the different sources of data are time aligned using an absolute measure of time or by pattern matching the peaks. It is then easy to see how one base station's knowledge of the identify of a mobile's peak may be used to assign the identity to the peaks corresponding to the same mobile in other base stations. Thus on the right hand side of FIG. 2, the question marks have been replaced by the correct identities obtained from the other base stations (the vertical arrows show the flow of information). Once the identities have been assigned, it is then possible to compute all of the ratios $L_{lmj}/L_{lml}$ using the measurements.

When a new mobile is required to be activated, its parameters must be measured. This requires that the mobile transmit, with attendant dangers of instability. The new mobile will estimate the appropriate power needed to transmit (e.g., by measurement of downlink transmissions) and send a signal burst of the known sequence but without data. In this way, if the new mobile is not acceptable by the network, only a small disruption will occur. Ideally, any errors generated in the reception from active mobiles during the transmission of the known sequence by the new mobile, should be correctable by forward error correction coding. The power of the new mobile would not be controlled during the transmission of this known sequence. The mobile would append an identifier for its target base station for affiliation so that it could be recognized as a new mobile requesting affiliation to that base station. Once the parameters for the new mobile have been obtained, the stability test can be tried to determine whether access can be given to the new mobile.

The time of transmission of the known sequence may be random, pseudo random or coordinated.

In the case of random timing, the mobile makes a random decision as to which point within the data transmission to place the known sequence. It relies on the base station to recognize the mobile-specific identifier. Here, the mobile-specific identifier would need to include data encoding the exact position within the burst in which the known sequence was included so that the data bits can be correctly assigned. This random placement can be updated as frequently or infrequently as system requirements determine. The maximum rate is once per data burst.

In the case of pseudo random timing, the mobile chooses a pre-arranged, but apparently random, place to include the known data sequence. In this case there is no need for the mobile to inform the base station of the placement since it is able to determine this itself from a local version of the pseudo random placement generator. The update rate for this approach has the same potential for flexibility as for random timing.

In the case of coordinated timing, each base station uses information about collisions between correlation peaks to instruct its mobile(s) to alter their placement in order to separate the peaks.

No matter which of the placement schemes is used, the probability of collisions between peaks must be relatively low. Specifically, the peaks should have a low probability of being separated by less than the differential propagation delay uncertainty. This is for two reasons.

Firstly, the different time maps generated by each base station will have a timing uncertainty window around each of the correlations peaks dependent upon the propagation delay uncertainty. The peaks will appear at different times within these windows for different base stations. Unless the peaks for different mobiles are separated by at least this window width, there will be an ambiguity in assignment of mobile identity.

Secondly, if this invention is used in a cellular system with large transmission rates, either for the known sequence alone, or for the data or both (e.g., direct sequence spread spectrum) then there may be a significant multipath delay spread. Measurement of the signal power will involve the summation of multiple resolved multipath components. If the peaks from two mobiles are inadequately separated, in time the peaks from two mobiles may be combined as from one.

The random or pseudo random placement schemes are to be preferred on the rounds of simplicity. If random placement is used, then it should be possible to arrange the system parameters such that it is very unlikely that the transmissions from a particular mobile are involved in collisions in two successive transmission bursts. Collisions can easily be detected since they will arise whenever two base stations receive their mobiles' known sequence bursts with a time separation less than the delay uncertainty window. In this case the parameter values obtained in the previous frame must be reused.

Referring now to FIG. 3, FIG. 3 illustrates the architecture for four base stations connected to a common control center 4, (e.g., a mobile switching center). Each base station 1, 2, 3 demodulates the signal and performs the normal processing applicable to cellular mobile communications in a unit 5 which will be familiar to those versed in the art. In addition, the functions of a known sequence correlator 6, a signal identifier 7 and a data logger 8, as shown in FIG. 3, are performed. The known sequence transmitted by the mobiles is correlated in the known sequence correlator 6. Whenever a known sequence is found above a correlation threshold, the signal identifier 7 is enabled. If the identification sequence for the mobile is found following the known sequence (as in this example), then the mobile is deemed to belong to the base station and its data is demodulated. Note that the block 5 entitled "RF processing and baseband processing" contains memory which enables the receiver to demodulate data received prior to the reception of the known sequence and the identifier. In addition to the identified peak, other non-identifiable peaks may be detected. The amplitudes and times of reception of these are all fed to the logger 8 for each base station. At the end of each data transmission burst frame, the data contained within the loggers of each base station are sent to the control center 4 from all of the base stations 1, 2, 3.

The control center 4 comprises the following serially connected data processor units, a time align unit 9, a cross assign identities unit 10, a compute cross coupling factor unit 11, and a compute stability unit 12. The unit 9 first time aligns the data either using absolute time markers on the data (this is possible if the base stations are accurately synchronized) or by using pattern matching of the peak times over the different data from the different base stations.

Next, the known identities are assigned in the unit 10 to the unknown identities using time matching. Finally, the cross coupling factors and stability are computed in units 11 and 12. This information is fed back to the relevant base station(s) 1, 2, 3 for use as required via lines 13, 14 and 15, respectively.

Although modifications and changes may be suggested by those skilled in the art, it is the intention of the inventors to embody within the patent warranted hereon all changes and modifications as reasonably and properly come within the scope of their contribution to the art.

What is claimed is:

1. An automatic power control system for a cellular mobile radio system, comprising:
   a control center via which a plurality of base stations, each serving a cell, are linked to facilitate mutual communication between mobile units which gain access to the cellular mobile radio system via said base stations;

at least two mobile units distinguishable by identification codes, the mobile units being arranged to transmit, in addition to an identification code unique to each mobile unit, a data sequence common to each mobile unit, but transmitted by each mobile unit at a nominally different time within each burst;

each of said base stations including correlator means operative to discriminate between signals from mobile units within its own cell and interfering signals from mobile units in adjacent cells and a data logger; and a data processing means located at the control center and arranged to merge data from said data loggers located at each of said base stations, which serves to store the results of correlation of the data sequence common to each mobile unit, so that details of relative power levels and times of reception are recorded as these details relate to signals received, the control center including a signal processor responsive to the data logger at each base station for identifying mobile units involved in potentially mutually interfering situations and feeding back instructions as appropriate to each of said base stations whereby power control signals are transmitted to these mobile units over the radio link from the base stations.

2. The system of claim 1, wherein said data sequence is random in time and communicated to a base station by a mobile unit with which it is in communication.

3. The system of claim 2, wherein said data sequence is pseudo random in time and predetermined to an extent that it is known in advance by both the base station and a mobile unit with which it is in communication.

4. The system of claim 1, wherein a collision avoidance scheme is provided at a base station which instructs one or more mobile units to change their time of transmission if there is a potential mutual interference problem caused by two or more mobile units selecting transmission times which are equal or overlapped.

5. The system of claim 3, wherein a data replacement system is employed at the control center which anticipates data damage caused by mutual interference by knowledge of the pseudo-random times at which the mobile units will transmit, and replaces the damaged data with valid data from previous bursts.

* * * * *